Nov. 12, 1929.   B. M. SHIPLEY   1,735,062
CASH REGISTER
Original Filed Jan. 21, 1924   5 Sheets-Sheet 1

Inventor
Bernis M. Shipley
By Earl Beust
Henry E. Stauffer
His Attorneys

Nov. 12, 1929.      B. M. SHIPLEY      1,735,062
CASH REGISTER
Original Filed Jan. 21, 1924     5 Sheets-Sheet 2

Inventor
Bernis M. Shipley
By Earl Beust
Henry E. Stauffer
His Attorneys

Nov. 12, 1929.  B. M. SHIPLEY  1,735,062

CASH REGISTER

Original Filed Jan. 21, 1924   5 Sheets-Sheet 3

Inventor
Bernis M. Shipley
By Earl Benst
Henry E Stauffer
His Attorneys

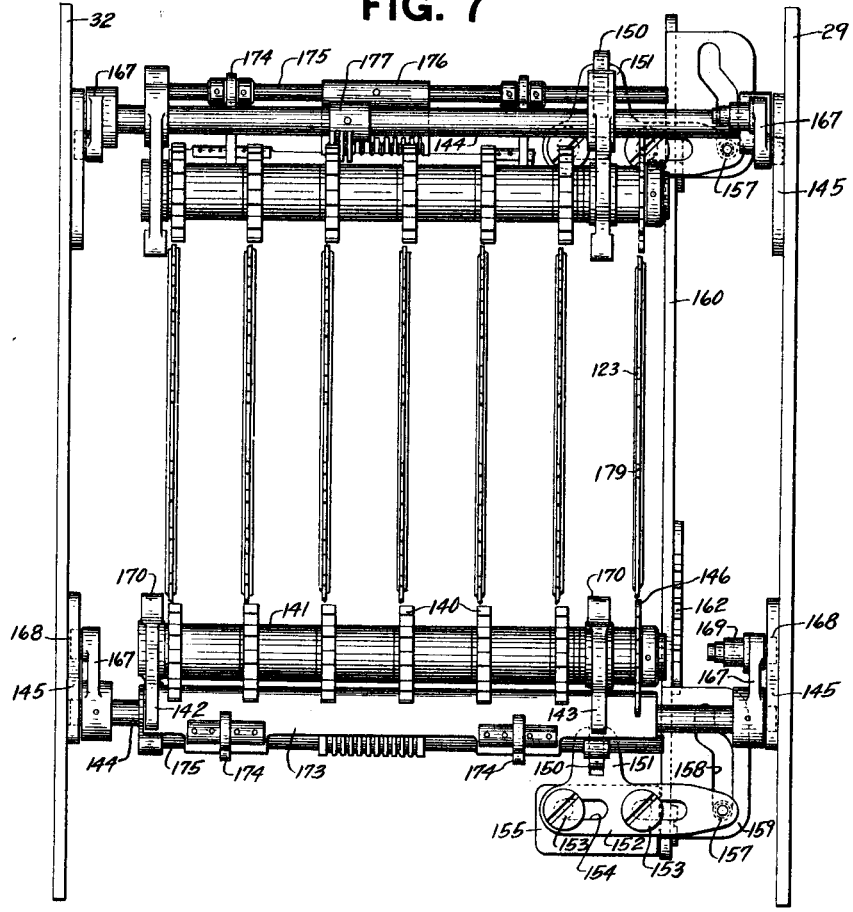

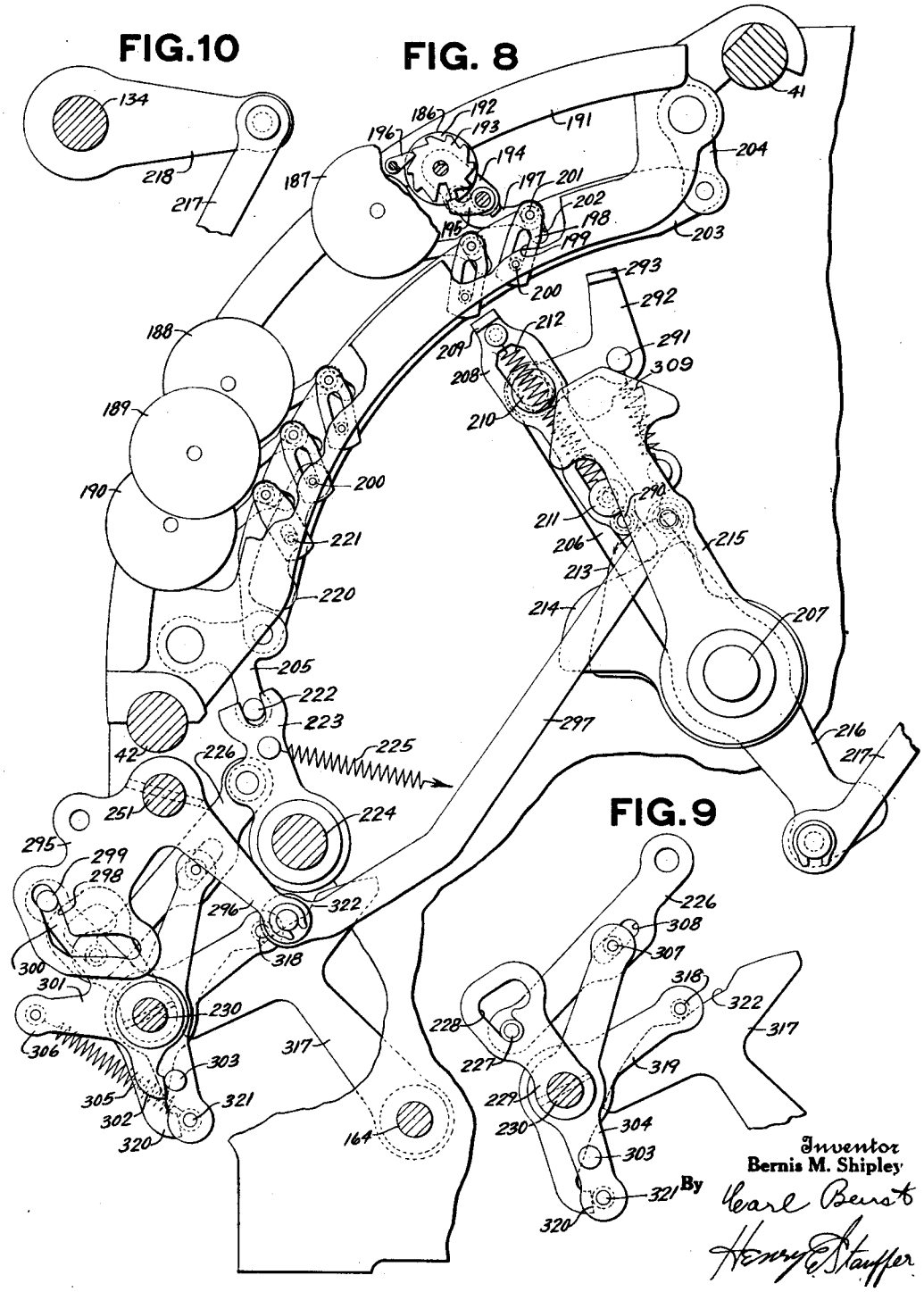

Patented Nov. 12, 1929

1,735,062

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 21, 1924, Serial No. 687,536. Renewed August 3, 1928.

This invention relates to cash registers, and more particularly to the type of register shown and described in the co-pending application of the present inventor, Serial No. 608,281, filed December 21, 1922.

The principal object of this invention is to provide a machine which will keep an accurate account of the cash in stores where a large quantity of the goods is priced at fractional amounts, such for instance, 10½¢, 12½¢, etc.

Another object is to provide such a machine with a totalizer capable of receiving even and fractional amounts.

Another object is to construct the totalizer so that it may be entirely disabled on certain operations to permit printing of items without the addition of such items on the totalizer.

Still another object is to provide a machine with a plurality of special counters for keeping account of various kinds of transactions, the number of item totals, and the number of single item transactions, having a ½¢ in addition to the even amount.

Another object is to include in such a machine novel mechanism for disabling certain of the special counters on totalizing operations.

With these and incidental objects in view, the invention includes certain novel features and combinations of parts, the essential elements of which are set forth in appended claims and a preferred form or embodiment of which is hereinafter described with reference to the drawings which accompany and form part of this specification.

Of said drawings:

Fig. 7 is a top plan view of the front and back totalizer lines together with the differential actuators therefor.

Fig. 8 is a detail vertical sectional view on an enlarged scale, showing special counters and the mechanism which cooperates therewith.

Fig. 9 is a detail side elevation of the mechanism for actuating the special counters, and also shows a portion of the means for disabling this actuating mechanism.

Fig. 10 is a detail side view of part of the mechanism for connecting the special counter selecting mechanism with the transaction bank.

General description

Figure 1:
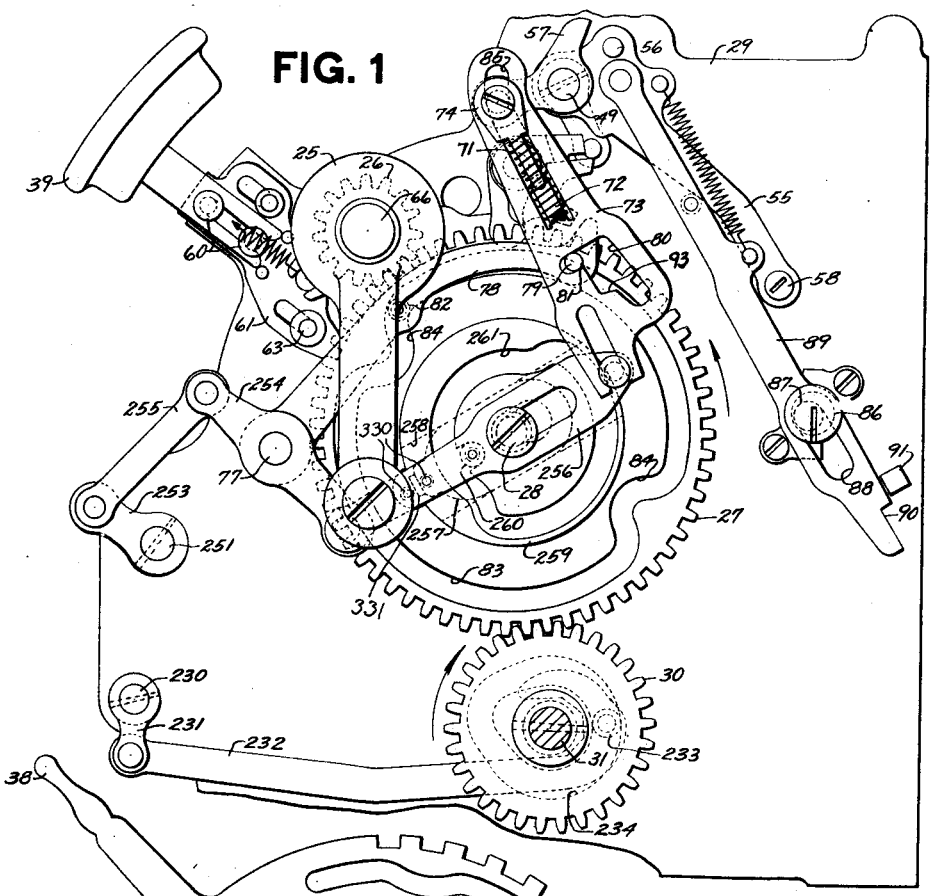
Figure 1 is a right hand side elevation of the machine embodying the invention, with the cabinet removed.

The machine shown herein and which embodies the invention, is particularly adapted for use in cash grocery stores which have a large amount of their merchandise priced to sell for fractional amounts. It is customary in such stores for the purchaser to pass around the store, taking whatever he desires and, before leaving, submit his purchases to a cashier who will add up the amounts thereof. The majority of customers, in such a store, buy more than one article and, therefore, the usual transaction is one which will be called herein a multiple item transaction. Supposing for example, that the customer brought five different items, four of which were priced at amounts ending with ½¢. It can be seen that the total of these five items is an even amount, as there are four 1/2¢ items to be added in. In order to take care of such a transaction the machine is provided with several banks of amount keys and in an additional bank there is provided at ½¢ key. The machine is also provided with three totalizers one of which is rocked into engagement with the actuator only during the entry of multiple item transactions and the other two are rocked into engagement with the actuators on every adding operation except when money is paid out. The first of these is the upper totalizer and is used for adding the items of a multiple item transaction. At the end of the transaction, this totalizer is reset to zero and the amount standing thereon is printed upon a receipt which is given to the customer. The second of the totalizers, the rear totalizer, may be used to accumulate the daily total of business done, while the third, or the front totalizer can be used to accumulate the business done over a longer period, such for instance, as a week or month. In all of the totalizers an additional totalizer wheel is provided which is controlled by the ½¢ key. This totalizer wheel will be given one unit of movement whenever an item ending in ½¢ is entered. Transfer mechanism is provided which will transfer "one" to the units of cents totalizer wheel upon every second movement of the ½¢ wheel.

It can be seen from the above that this machine will keep an accurate account of all multiple item transactions where there is no ½¢ in the total of such items. When, however, a series of items is entered which has an uneven number of ½¢ items contained therein, there will be a ½¢ added to the total of the multiple item transaction. When this occurs the store charges the customer with an extra ½¢ and it is necessary in order that the clerk may have an accurate check on his cash to provide some means for keeping account of the extra ½¢ taken in on such transactions as just described.

In order to accomplish the above result, the machine is provided with a special step-by-step counter which will automatically be actuated on every operation of the machine when the total of a multiple item transaction ends in ½¢. It is evident from the above that when the clerk checks his cash at the end of a day's business, the amount of money in the cash drawer should equal the amount shown on the totalizer plus the number of ½ cents shown by the ½¢ counter.

Other special counters are provided herein for keeping account of various classes of transactions, such for instance, as the number of single item transactions, the number of multiple item transactions, the amount of which does not end in a half cent, and the number of "paid out" transactions. With regard to the latter, it should be said that the two lower totalizers are shifted to an ineffective position and the upper totalizer is held disengaged when such transactions are being registered.

Suitable printing mechanism is provided, but as it forms no part of the invention, it is neither shown nor described herein.

Driving mechanism

The machine, as shown herein, is adapted to be driven by means of a crank handle 25, (Fig. 1), carrying a gear 26 supported by a stud 66, meshing with a large gear 27 mounted on a stud 28 in the right hand side frame 29 of the machine. The gear 27 (Fig. 1) meshes with a gear 30 fast on a main drive shaft 31 supported by the right hand side frame 29 and a side frame 32 (Figs. 6 and 7) on the left hand side of the machine. These gears are so proportioned that two complete forward revolutions of the crank handle 25 will give the drive shaft 31 one complete revolution in a clockwise direction. If desired, the machine can be driven by any suitable means, such for instance, as an electric motor of any suitable design, as illustrated in the U. S. Patent to Kettering and Chryst, No. 1,144,418, issued June 29, 1915.

Keyboard

The keyboard comprises four or more banks of amount keys 34 (Fig. 4), and a bank of transaction keys, (Fig. 6), in which are located the cash key 35, the paid out key 36, and the ½¢ key 37. To the right of the transaction bank is the total lever 38 (Fig. 2) which controls the machine on totalizing operations, as is well known in machines of this type. On the extreme right hand side of the machine is a release key 39 (Figs. 1 and 3), which, when depressed, releases the machine for operation.

The keys 34 (Fig. 4) for the amount banks are slidably mounted in a key frame 40 supported at its upper and lower ends by rods 41 and 42 respectively. The keys 34 are maintained in their normal outward positions by means of coiled springs 46 (Fig. 6). When depressed, the keys are held in their depressed positions by means of a detent bar 43 supported at its upper end by a pivoted link 44 and at its lower end by a pivoted link 45. The usual locking detent (not shown) is also provided to lock the depressed keys in their depressed positions and prevent the depression of any of the undepressed keys during an operation of the machine. Near the end of the operation of the machine, the depressed keys are released by means of a rod 47 carried by arms 48 fast on a shaft 49 which is the release shaft. The release rod 47 cooperates with a bifurcated member 94 which supports the upper end of the locking detent, (not shown) and moves this detent to its locking and unlocking positions. The release shaft 49 is given a slight clockwise movement (Fig. 4) near the end of the operation, which will bring the release rod 47 into engagement with a tail 50 of the pivoted link 44, thereby rocking this link counter-clockwise and moving the detent bar 43 downward far enough to release the depressed keys.

The "Cash" and "Paid out" keys, and the ½ cent key 37, (Fig. 6), are mounted in the same key bank. They are depressed and held in their depressed positions by mechanism which is well known in the art, and therefore, not shown herein.

An interlocking mechanism is provided, which prevents the release of the machine if one of these keys is only partially depressed and also prevents the depression of any of these keys after the machine has been released. Fast on the release shaft 49 is a stop arm 51 which cooperates with a control plate 52 loose on a shaft 53 supported by the side frames 29 and 32. The control plate 52 has a bifurcated portion adapted to embrace a pin mounted on the pivoted link supporting one of the detent bars actuated by the keys of this bank. The stop arm 51 and the control plate 52 normally lie in such positions that either can rock relatively to the other. When this detent bar is moved down, owing to the depression of any of the keys in this bank, the control plate 52 will be rocked counter-clockwise (Fig. 6), to position the control plate in the path of movement of the stop arm 51 until the detent bar is fully depressed, whereupon the detent bar and control plate 52 will be returned to their normal positions by the usual detent bar restoring spring, as shown in Fig. 6. While the control plate 52 is in the path of movement of the stop arm 51, it is evident that the release shaft 49 cannot be rocked in a clockwise direction, which is the direction of movement in which it operates when the machine is released. When, however, the control plate 52 is returned to normal the stop arm 51 is free to rock far enough to permit the release of the machine. On the other hand, if the machine has been released, then none of the keys in this bank can be depressed as the stop arm 51 will have been rocked clockwise far enough to lie in the path of the control plate 52, thereby preventing any counter-clockwise movement of this control plate and so prevent the depression of any keys in this bank.

The stop arm 51 has another function which is to release the keys of this bank. Near the end of the operation, the release shaft 49 is rocked counter-clockwise (Fig. 6) slightly past normal position. When this occurs, a finger 92 of the stop arm 51 contacts with the pivoted link which supports the upper end of the detent bar and moves said detent bar downwardly far enough to release the depressed keys, whereupon the parts all return to the positions shown in Fig. 6.

For the purpose of releasing all of the depressed keys previously to the operation of the machine, a mechanism is provided which will rock the release shaft 49 in a counter-clockwise direction (Fig. 1) for accomplishing this purpose. A correction lever 55 is loosely mounted upon the release shaft 49 near its right hand end (Fig. 1). This correction lever carries a pin 56 which is adapted to cooperate with an upwardly extending arm of a bell crank lever 57 fast on the release shaft 49. At its lower end the correction lever 55 has a long pin 58 which extends through the cabinet of the machine far enough to be grasped by the hand of the operator. If it is desired to release the depressed keys, this lever 55 is rocked in a counter-clockwise direction to bring the pin 56 into contact with the upwardly extending arm of bell crank lever 57, and as this bell crank lever is fast on the release shaft 49, the shaft will be rocked slightly counter-clockwise which will, through the mechanism above described, release the depressed keys.

Release mechanism

The machine is normally locked against operation and must be released before such operation can take place. To accomplish this result, a release key 39 (Figs. 1 and 3) is provided, the shank of which is bifurcated to embrace supporting studs 60 carried by a plate 61 which, in turn, is slidably supported by two studs 62 and 63 projecting from the side frame 29. The plate 61 also carries a pin 64 (Fig. 3) embraced by a bifurcated arm of a bell crank 65, loosely mounted on the stud 66 projecting from the machine frame. Pivoted to the bell-crank lever 65 is a link 67, which at its opposite end, is pivoted to a bell crank lever 68 loose on a shaft 53. The other arm of the bell crank lever 68 normally lies in the path of a half-round stud 69 carried by a locking arm 70 fast on the release shaft 49.

When the release key 39 is depressed, the plate 61 will slide inward on the studs 62 and 63 to the extent of the slots through which these studs project, and will, through the mechanism above described, rock the arm of bell crank 68 from in front of the half-round stud 69 carried by the locking arm 70. The release shaft 49 constantly tends to rock in a clockwise direction (Figs. 1 and 3) due to the influence of a spring 71, which is compressed between an extension 72 of a link 73 and shoulders formed on a pair of pilot members 74, pivoted to one arm of the bell crank lever 57. Therefore, when the bell crank lever 68 is rocked to move its arm from in front of the half-round stud 69, this stud, locking arm 70 and release shaft 49 will be quickly rocked in a clockwise direction until the upwardly extending arm of the bell crank lever 57 (Fig. 1) strikes the pin 56 on the correction lever 55, which is held against rotation in a clockwise direction by a pin carried by a link 89, which will be hereinafter described. When the locking arm 70 (Fig. 3) is rocked, as just described, the pin 69 will assume a position between an arm of the bell crank lever 68, and a pawl 75 loose on the shaft 53, and held in its normal position by a spring 76 extending between a pin on the pawl and a pin on the frame 29. The function of this pawl 75 is to prevent an immediate second operation of the machine if the release key 39 be held in depressed position at the time the release shaft 49 is rocked slightly past normal near the end of an operation. The extent of counter-clockwise movement (Fig. 3) of the release shaft 49, together with the locking arm 70 and stud 69, past normal position to release the depressed keys, is sufficient to withdraw the stud 69 from beneath the arm of bell crank 68, whereupon the spring 76 rocks pawl 75 into the path of the stud 69. The pawl 75 is slightly longer than the arm of bell crank 68, and has a limiting arm co-acting with a stud to hold the pawl in effective position.

Therefore, when the restoring spring returns the release key 39 to its normal undepressed position, it restores the linkage thereto connected, including the bell-crank 68. The usual overhanging lug on the arm of the bell-crank, as it returns to normal position in the path of the stud 69, contacts the pawl 75 and rocks it clockwise out of the path of the stud 69.

The foregoing locking mechanism is shown in U. S. Patent to Shipley, 1,619,796, March 1, 1927, to which reference is made for a more complete explanation of this part of the machine.

Near the end of the operation of the machine, the release shaft 49 is rocked counter-clockwise (Fig. 1) slightly past its normal position and then clockwise to its normal position by the following mechanism. Pivoted on a stud 77 in the frame 29 is a curved arm 78 which at its free end, carries a pin 79 projecting through a shouldered opening 80 in the link 73. On normal adding operations, the pin 79 engages with a shoulder 81, as can be seen in Fig. 1. The arm 78 carries a roller 82 projecting into a cam groove 83 formed in the large drive gear 27 previously described. It will be remembered that this gear is given one half of a complete counter-clockwise rotation upon every cycle of operation of the machine. The groove 83, therefore, has two cam portions 84 formed therein, one of which cooperates with the roller 82 near the end of a cycle of operation. When the cam portion 84 engages the roller 82, the arm 78 will be rocked clockwise and then counter-clockwise to normal position. Upon its clockwise movement, the pin 79 carried thereby will contact with the shoulder 81 formed in the opening 80 of the link 73 and will lower this link. As the link 73 moves down, the pin on bell crank 57, which forms the pivotal connection between the pilot members 74 and the bell crank lever 57, will be engaged by the upper end of a slot 85 in the upper end of the link 73, through which this pin projects, whereby the bell crank lever 57 and release shaft 49 will be rocked counter-clockwise slightly past the normal position of the parts and then clockwise to their normal position in a manner well known in the art.

Machine lock

Mechanism is provided for manually locking the machine so as to prevent any operation thereof. In order to accomplish this function, the operator inserts a key into a key barrel 86 (Fig. 1), which has an eccentric portion 87 cooperating with a slot 88 in the locking link 89, which at its upper end, is pivoted to the correction lever 55, previously described. When it is desired to lock the machine, the correction lever 55 is raised manually, thereby also raising the locking link 89. While in its raised position, the inserted key is revolved in the key barrel 86 which, through the eccentric portion 87 thereof, will rock the locking link 89 counter clockwise about its pivotal connection with the correction lever 55, far enough to bring the notch 90, formed in the lower end of said link, into engagement with a squared stud 91 projecting from the machine, as can be seen from Fig. 1. When the locking link 89 occupies this position, it will be impossible to rock the release shaft 49 in a clockwise direction to release the machine.

Differential mechanism

The amount differential mechanism (Fig. 4) used in this machine is identically the same as that used in the above referred to co-pending application and is very well known in the art. Therefore, only a brief description of this mechanism will be given herein. There is one differential unit for each bank of amount keys. Each differential unit is driven by a pair of cams 101 and 102 (Fig. 4) fast on the main drive shaft 31. Cooperating with each pair of cams is a Y-shaped member 103 pivotally mounted upon one of the differential unit supporting frames 104, and carrying two rollers 105 and 106, which cooperate with the cams 101 and 102. Pivoted to the upper end of the Y-shaped member 103 is a short link 107 which, at its opposite end, is pivotally connected to a driving segment 108 journaled on a tubular post 109 supported by the supporting frames 104. The driving segment 108, has a shoulder formed therein, with which the left hand end (Fig. 4) of a latch 110 normally cooperates. This latch is pivotally supported by an arm 111 and bell crank lever 112, which in turn, are carried by a pair of actuating rack supporting members 113 also journaled on the tubular post 109. Between the members 113 are carried the actuating racks 115 which are adapted to mesh with and actuate the totalizer wheels 140.

Figure 4:
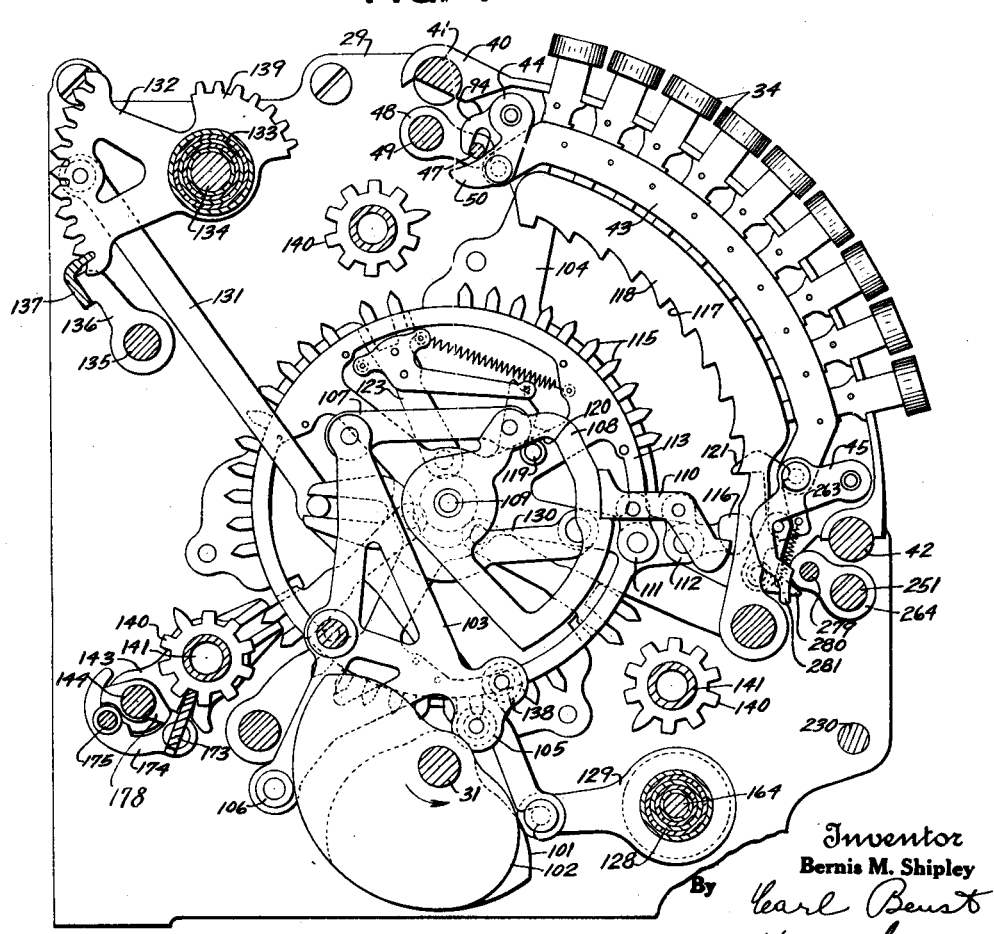
Fig. 4 is a vertical sectional view through the machine taken just to the left of one of the amount banks.
Figures 5, 6:
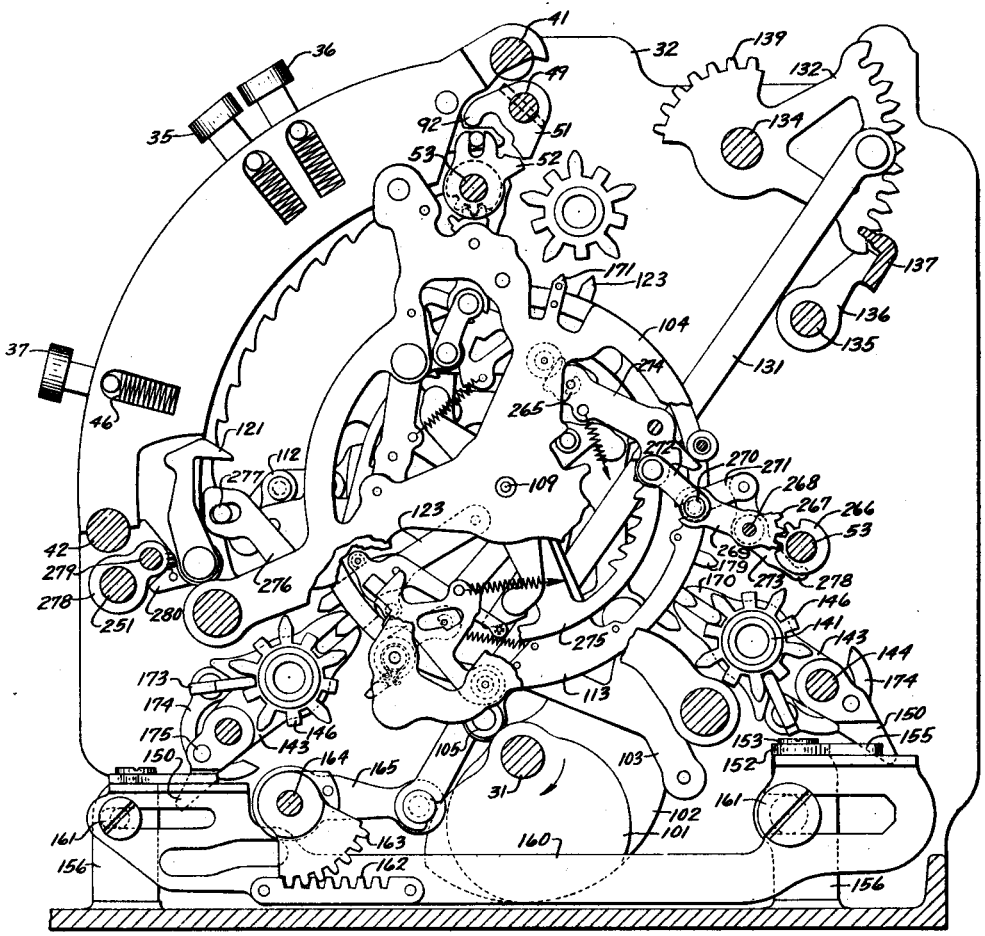
Fig. 5 is a detail sectional view of the totalizer alining mechanism.
Fig. 6 is a vertical sectional view through the machine taken just to the right of the transaction bank.

It can be seen from Fig. 4 that as the cams 101 and 102 are rotated in a counter-clockwise direction during the operation of the machine, the Y-shaped member 103 will be rocked first counter-clockwise and then clockwise about its pivot. This movement will be communicated to the driving segment 108 by the link 107, and will rock the segment 108 first counter-clockwise and then clockwise to normal position. As the left hand end of the latch 110 is in engagement with the shoulder on the segment 108, the members 113, and actuating segments 115 are carried with the driving segment 108 until the forwardly extending end 116, of the bell crank lever 112, comes into contact with the inner end of whichever one of the keys has been depressed. When this occurs, the bell crank lever 112 will be rocked clockwise (Fig. 4) to withdraw the latch 110 from its engagement with the shoulder of the driving segment 108. As this disengagement takes place, the forward end of the latch 110 will engage the appropriate one of a series of notches 117 formed in a plate 118 carried by the supporting frames 104, to hold the actuating segments 115 in their set positions. The driving segment 108 will continue its counter-clockwise movement to the full extent thereof and will then be returned in a clockwise direction to its normal position. Upon this return movement, a stud 119, projecting from one of the members 113, will be engaged by a surface 120, of the driving segment, and the actuating segment 115 and its supporting members 113 will thereby be returned to their normal positions.

In case no key in a bank is depressed, the outer end of an arm 276 projecting from a reset spider 275, turning about the post 109, such as shown in Fig. 6, will come into contact with a zero stop pawl 121 which will disconnect the latch 110 in the "zero" position, thus preventing the actuating segments 115 for this bank from actuating their totalizer wheels 140 to any extent whatever, as is well known in the art. If, however, a key is depressed, the detent bar 43 (Fig. 4) is moved downward, as above described, which movement will rock the arm 45 in a counter-clockwise direction. This arm terminates in a hook which cooperates with a pin projecting laterally from an arm fast on the same shaft as the zero stop pawl 121, and upon the counter-clockwise movement of this arm 45, the zero stop pawl will be rocked to its ineffective position in which it will not affect the movement of the actuating segment 115.

Transfer arms 123 are provided which, whenever the transfer is to be effected. will add an additional unit to the totalizer wheel corresponding therewith in a manner which is very well known in the art.

*Transaction bank differential mechanism*

The differential mechanism for the transaction bank is slightly different from the transaction bank mechanism usually provided for machines of this class. This difference is due to the fact that the ½ cent key is located in this bank and it is, therefore, necessary to provide totalizer-actuating means in this bank, which is placed under the control of the said ½ cent key. This totalizer-actuating means includes the supporting frames 104, (Fig. 6) such as used in amount banks, together with transfer arms 123 such as are used in the said amount banks, and totalizer actuators provided with but one tooth 179. As each of the totalizer wheels appropriate to the transaction bank only receives one unit of movement whenever the ½ cent key is depressed, and transfers on every other operation, it is unnecessary to have more than a single tooth on the totalizer actuators in this bank. It is not thought necessary to further describe the differential mechanism used in connection with this bank, as it is identically the same as that used with the amount banks, just above described, and the various parts thereof have been given the same reference numerals that have been given to the same parts of said amount differential mechanism.

*Differential alining mechanism*

Pivoted to each pair of the differentially movable members 113 (Fig. 4) for the amount and transaction banks, is a beam 130 which at its rear end is bifurcated and cooperates with a pin carried by a link 131. At its upper end, this link is pivoted to a toothed segment 132 fast on one of a series of sleeves 133 or a shaft 134 which supports the said sleeves. Fast on a shaft 135 supported by the machine side frames 29 and 32 are a plurality of arms 136 which carry an alining plate 137 adapted to engage with the teeth of the segment 132. Near the beginning of the operation of the machine, the shaft 135, arms 136 and plate 137 are rocked counter-clockwise (Fig. 4) by mechanism (not shown herein), which is old and well known in the art, in order to remove the alining plate 137 from engagement with the teeth of segment 132. The differential mechanism is then operated and during this operation a roller 138 carried by the Y-shaped lever 103 cooperates with the beam 130 to shift it from the position at which it was left at the last operation to a position corresponding to the position of the differential mechanism. The movement of the beam 130 will raise or lower the link 131 and rock the segment 132 clockwise or counter-clockwise to its new position. After it has been set, the alining plate 137 is again moved into engagement with the teeth of the segment 132 in order to correctly aline the parts. Integral with each segment 132 is a segment gear 139 which cooperates with and actuates the indicating mechanism for the register. This mechanism is, however, not shown herein. The sleeves 133 and shaft 134 are for the purpose of connecting duplicate indicators which appear at the front and back of the machine so that they receive the same movement from their corresponding differential mechanism.

At their lower ends, the links 131 are pivoted to individual arms 129 which are fast to their respective sleeves 128 supported by a shaft 164. At their opposite ends, these sleeves are operably connected to type wheels to adjust the same differentially in accordance with the keys depressed.

Totalizers

As above mentioned, there are three totalizer lines in this machine. The upper totalizer line is for accumulating the totals of multiple item transactions. It is rocked into engagement with the differential actuators 115 on every operation of the machine, except when a single item transaction is registered, or when the daily or periodical totals are taken from the front and back totalizer lines or when entering "paid out" transactions. There is just one set of totalizer wheels on each totalizer line in this machine, as three totalizers are all that are required. The front and back totalizer lines are for the purpose of accumulating the totals of all items bought and are rocked into engagement with the actuators on every operation, except when the "Paid out" key is depressed. As the front and back totalizers are identical, it is thought that a description of one will be sufficient for both. As shown in Fig. 7, each of these totalizers includes six totalizer wheels 140 loosely mounted on a tubular rod 141 supported at its ends by arms 142 and 143 carried by a shaft 144, the ends of which rest in cam grooves (not shown) in guide plates 145 fast to the machine side frames 29 and 32.

Also loosely mounted on each of the tubes 141 is a totalizer wheel 146 which is less than one-half the width of the other totalizer wheels 140. This wheel is adapted to be actuated by the differential mechanism in the transaction bank shown in Fig. 6. It will be recalled that the means for actuating this wheel comprises the transfer arm 123 and a one-tooth actuator 179. As is evident from Fig. 6, each of the totalizer wheels 146 for registering half cents, has every other one of its teeth made longer in order to cooperate with the transfer mechanism of next higher denomination and transfer "1" to the units wheel 140 upon every second unit of movement of the half cent wheel. The means whereby this transfer is accomplished is not described herein, as it is identical with the transfer means long known and used in machines of this type.

When an amount which ends in a half cent is entered in the totalizers, it is evident that the transfer arms 123 and the actuators 179 in the transaction bank differential mechanism will move the half cent wheels 146 one space. When, however, it is desired to enter an amount which does not end in a half cent, it is necessary to provide means for rendering the actuators for the half cent totalizer wheels ineffective. As seen in Fig. 7, the totalizer wheels 140, 146 are in position to receive an actuation from all of the actuators, including the half cent actuators 179. When the amount to be entered does not end in half cent it is necessary to press either the cash key 35 or the Paid out key 36. Since these two keys are in the same bank with the half cent key the actuator 179 will be moved to a position as determined by the depressed key 35 or 36, and therefore it is necessary to shift the half cent totalizer element out of the plane of the actuator 79.

When it is not desired to have the half cent actuators engage with the half cent totalizer wheels, the front and back totalizers are moved laterally far enough to move the half cent totalizer wheels 146 out of the plane of the actuators 123, but not so far as to move the other totalizer wheels 140 out of the planes of their various actuators 115. This is possible due to the fact that the other totalizer wheels 140 are over twice the width of the half cent wheels. The totalizers may then be engaged and operated without any actuation being given to the half cent wheels.

The mechanism whereby the totalizers are shifted to the positions above mentioned will now be described. The arms 143 which carry the right hand ends of the front and rear totalizer lines, as seen in Figs. 6 and 7, are each forwardly and downwardly extended as at 150, each of which extensions are embraced by a bifurcation 151 on its respective slide 152, shiftably mounted on studs 153 which project through slots 154 in said slide. The studs 153 extend upwardly from a horizontal table 155 mounted on an upright 156 secured to the base of the machine. Each of the slides 152 projects over a laterally extending flange 159 formed on the opposite ends of a sliding bar 160. Each slide 152 carries a roller 157 (Fig. 7) extending through a cam slot 158 in its respective flange 159 of the sliding bar 160, which bar is carried by studs 161 supported by the uprights 156 and extending through slots in said sliding member. Secured to the side of said sliding bar is a rack 162 with which meshes a segment gear 163 loosely mounted on the shaft 164 and rigidly secured to an arm 165 also loose on said shaft. At its opposite end, the arm 165 is pivoted to the link 131, above described, for the transaction bank. This link is positioned under the control of the differential mechanism for this bank, by its appropriate beam 130, in a well known manner, and it will, through this mechanism, be rocked varying distances, depending upon the setting of the differential mechanism. The downward movement of the link 131 will rock the arm 165 and segment gear 163 clockwise (Fig. 6), which will, through the rack 162, slide the bar 160 toward the front of the machine an extent determined by the operation of the differential mechanism. It can be seen from Fig. 7 that, as the bar 160 is moved forwardly, the roller 157 will cooperate with the curved slot 158 in the flange 159 for each of the front and back totalizer lines. When the sliding bar 160 moves far enough to cause the curved portion of the slots 158 to engage the rollers 157, the slides 152 will be shifted toward the left (Fig. 6), and this movement, due to the cooperation of the bifurcations 151 with the extensions 150 of the totalizer supporting arms 143, will slide the totalizers bodily along the shafts 144 far enough to disengage the half cent totalizer wheels 146 from their actuators 179, but not far enough to move the other totalizer wheels 140 out of the planes of their actuators 115. This is the position which the parts will assume when the "Cash" key 35 is depressed and the latch of the differential mechanism is disconnected in that position. In this position, the amount set up by the keys 34 will be added to the regular totalizer wheels 140, but nothing will be added to the half cent wheels 146.

When the "Paid out" key is depressed, it is desired to entirely disengage the totalizers from their actuators, because an amount paid should not be added to the cash totalizers. In order to do this, it is only necessary to move the sliding bar 160 a little farther forward, as seen in Fig. 7. This will continue the movement of the slide 152 toward the left, due to the shape of the slot 158 for each of the front and rear totalizers, which will, of course, slide the totalizers farther toward the left to a position in which none of the totalizer wheels 140 or 146 will engage with the actuators 115 or 179. If, on the next operation of the machine, it is desired to register a half cent, the differential mechanism for the transaction bank will be arrested by the depressed half cent key in the "1" position, which corresponds with the half-cent key, and, upon the operation of the beam 130 for this bank, the slidable bar 160 will be moved toward the back of the machine, and, due to the shape of the slots 158, will cause the slides 152, and therefore the totalizers, to slide toward the right in Fig. 7, to the position shown in this figure, which is the position in which the half cent totalizer wheels 146 will be actuated.

*Totalizer engaging mechanism*

The mechanism for moving the totalizer lines into and out of engagement with their respective actuators is not shown in detail herein, as it is very well known and has been used in nearly all of the machines of this type. Fast on each of the shafts 144 (Fig. 7) are a pair of arms 167 which have rollers 168 extending into cam groves (not shown) in the guide plates 145 above mentioned. One arm of each of the pairs of arms 167 carries a stud 169 to which is pivoted a link (not shown) which in turn cooperates with an engaging mechanism operated by the register. In this machine, this mechanism is so constructed that the arms 167 will be rocked on every adding operation of the machine except the one for the upper totalizer, when the "Cash" key is depressed, in a manner well known in the art. This movement, through the cam groves (not shown) in guide plates 145, will cause the totalizers to move inwardly into engagement with the differential actuators 115 and 179. Each of the totalizer supporting arms 142 and 143 has a bifurcated projection 170 (Figs. 4 and 6) adapted to cooperate with a tooth 171 (Fig. 6) carried by the differential mechanism supporting frames 104 in order to properly guide the totalizer in its engaging movement. Well known means is provided for alining the toalizer wheels of each totalizer while they are disengaged from the actuators. This means consists of a bar 173 which engages between the teeth of all the totalizer wheels when they are out of engagement with the actuators. This bar is carried by a pair of arms 174 which are loosely mounted on a rod 175 carried by the totalizer supporting arms 142 and 143. As the totalizer moves inwardly to engage the actuators, cams 178 (Fig. 4), fast on the shaft 144 contact with the arms 174 and causes them to be rocked counter-clockwise (Fig. 6), to withdraw the bar 174 from its engagement with the teeth of the totalizer wheels.

An additional alining mechanism is also provided to properly aline the totalizers after their lateral adjustment. This mechanism can be seen in Figs. 5 and 7. Pinned to the axially shiftable rod 175 is a comb 176 which has a plurality of grooves formed therein. Also fast on the shaft 144 is a collar 177 which has two projections 178 adapted to cooperate with the groves in the member 176. As the totalizer is engaged with the actuators 115, 179, the rod 175 is rocked clockwise (Fig. 5) and the shaft 144 is rocked counter-clockwise whereupon the projections on the collar 177 engage between the teeth on the comb 176, thereby correctly alining the totalizers in whichever one of their positions they have been set.

*Special counters*

There are five special step-by-step counters provided to count the number of different kinds of operations performed by the machine. These counters consist, first, of the "Paid out" counter 186, (Fig. 8), which is the upper counter shown in Fig. 8. This counter receives one unit of movement whenever an operation of the machine is performed with the "Paid out" key depressed.

The next lower counter 187, as seen in Fig. 8, counts the number of single item transactions. This counter is selected by the depression of the "Cash" key. Below the single item counter is a counter 188 which is actuated whenever the total of a multiple item transaction ends in one-half cent. This counter is for the purpose of keeping track of the extra half cents which are collected by the store when the total of a multiple item transactions ends in a half cent. That is, if the total of a plurality of purchases amounts to 75½ cents, a charge of 76 cents will be made the customer, and the half cent counter keeps count of these extra half cents so that the clerk may be able to accurately balance his cash after the day's business is ended.

The next lower counter, 189, is adapted to count "1" every time the total of a multiple item transaction which does not end in a half cent is printed. The lowest counter, 190, registers "1" for each item of a multiple item transaction.

The construction of these counters is old and well known in the art, and therefore, only a brief description of their construction will be given herein. All of the counters are supported in a frame 191 mounted at its upper and lower ends on the cross rods 41 and 42 respectively. Each counter includes a series of wheels 192 having ratchets 193 fast to their sides. Pivotally mounted on the axis of the counter wheels is a pawl-carrying arm 194 to which is pivoted a driving pawl 195 adapted to engage the ratchet 193 of lowest denomination. Transfer mechanism of the "deep notch" variety is used to transfer from lower to higher orders. A retaining pawl 196 for each of the ratchet wheels prevents any retrograde movement thereof. Also pivotally connected to the pawl-carrying arm 194 is a link 197 which, at its opposite end, is pivoted to a tappet 198 which has a slot 199 formed therein, through which projects a guide pin 200. The link 197 and the tappet 198 are pivotally connected by a stud 201 which projects through a U-shaped notch 202 formed in an actuating bar 203 suspended at its upper end by a pivoted link 204 and at its lower end by a pivoted link 205. In order to select the counter to be actuated a lever 206 is provided, loose on a stud 207 and at its upper end supporting a shiftable finger 208, the free end 209 of which finger is laterally turned. This finger 208 is slidably mounted on studs 210 and 211 carried by the actuating lever 206. The finger 208 is retracted by a spring 212 extending between a pin on the finger 208 and the guide stud 211. The sliding inward movement of the finger 208 is controlled by two cams 213 and 214. The cam 213 is fast to the frame of the machine and remains stationary. The cam 214, however, is hubbed to an arm 215 loose on the stud 207 and moves simultaneously with said arm in a manner to be later described.

It can be seen from Fig. 8 that when the sliding finger 208 is positioned beneath the lower end of the slotted tappet 198 of any of the counters, and the actuating bar 203 is moved downward, as will be later described, the tappet 198, and link 197 will combine to form a toggle which, when straightened by the downward movement of the bar 203 through the notch 202 and stud 201, will rock the pawl-carrying arm 194 clockwise about its axis, thereby causing the driving pawl 195 to engage the ratchet 193 and rotate the ratchet and its corresponding counter wheel one step.

The remaining counters, which are not selected for actuation, have no means for holding the tappet 198 against downward movement, and will not be actuated by the movement of the bar 203 because as this bar moves downward, the tappets 198 will simply slide along the guide pins 200 and no movement will be given to the counter wheels 192. The selecting lever 206 has an extension 216 to which is pivoted the lower end of a link 217 (Figs. 8 and 10), which at its upper end, is pivotally connected to an arm 218 fast on the indicator shaft 134 (Fig. 4). The shaft 134 is moved in accordance with the movement of the differential mechanism for the transaction bank through its appropriate beam 130 and link 131 which is connected to that segment 132 which is fast on shaft 134. It can therefore be seen that the selecting lever 206 is differentially positioned in accordance with the movement of the differential mechanism of the transaction bank. In the position shown in Fig. 8, the machine has just been operated with the "Cash" key 35 depressed. This movement has positioned the selecting lever 206 and sliding finger 208 below the single item counter 187. Therefore, when the actuating bar 203 was moved downward, "1" was added to the counter wheel 192 of lowest denomination in this counter.

If no key is depressed in the transaction bank, and the differential mechanism thereof is stopped in its zero position, the selecting lever 206 will also be stopped in its zero position. This will place the laterally turned end 209 of the sliding finger 208 in front of the end of an arm 220 (Fig. 8) which is pivoted on the pin 200 corresponding to counter 189 and which carries a pin 221 projecting through a slot in the tappet 198 for counter 190. It is evident that with the lip 209 of the finger 208 in position beneath the free end of the lever 220, the counter 190 which counts each item of a multiple item transaction, will be actuated upon the downward movement of the actuating plate 203, as the effect will be the same as if the lip 209 lay beneath the tappet 198 for this counter. If an item is entered which ends in a half cent, and the half cent key 37 is depressed, the differential mechanism for the transaction bank will be arrested in the "1" position, and therefore, the selecting lever 206 and finger 208 will also be positioned in the "1" position through the connections above described. This will cause the half-cent counter 190 to be actuated in the same manner as the other counters above described. By providing the downwardly extending lever 220 with its free end lying opposite to the position occupied by the selecting lever 206 when in zero position, the mechanism automatically effects the operation of the multiple item transaction counter 190, on the entry of a multiple item transaction, during which entries, no keys in the transaction bank are depressed.

The counters 188 and 189 are actuated only when totals of multiple item transactions are taken. It is evident that they cannot be used in item entering operations as there are no keys in the second and third positions of the transaction bank. Means for selecting the half cent total counter 188 and the multiple item total sales counter 189 for even cent totals will be described in connection with the totalizing operations.

As before mentioned, all of the special counters are actuated by the same actuating plate 203. The means whereby this plate is given its actuating movement will now be described. The pivoted bell crank 205 which supports the lower end of the actuating plate 203 has a downwardly extending arm carrying a pin 222 seated in the recessed end of an arm 223 loosely mounted on a rod 224 supported by the machine side frames. The arm 223, bell crank 205 and actuating plate 203 are held in their normal positions by means of a spring 225 which is stretched between a pin on the arm 223 and any suitable point of the mechanism. Pivoted to the arm 223 is a link 226 which at its opposite end carries a pin 227 (Fig. 9) which normally engages in a downwardly extending leg of an angular slot 228 formed in an arm 229 fast on a shaft 230 supported by the machine side frames (Fig. 9). Also fast on the shaft 230 is a crank 231 (Fig. 1) to which is pivoted the left hand end of a pitman 232 which at its opposite end is adapted to slide on the main drive shaft 31. This pitman carries a roller 233 which cooperates with a cam groove 234 cut in the side of the drive gear 30 previously mentioned. This drive gear receives one complete revolution on every operation of the machine and the shape of the cam groove 234 is such that such a revolution will move the pitman 232 first to the right and then to the left, as seen in said figure. This reciprocatory movement will rock the shaft 230 and its arm 229 first counter-clockwise and then clockwise to normal position and through the connection of the pin 227 with the angular slot 228, will move the link 226 downward and rock the arm 223 counter-clockwise and then clockwise. As the arm 223 cooperates with the pin 222 on bell crank 205, the latter will be rocked clockwise, which movement will lower the actuating plate 203 far enough to actuate the selected counter and will then return the said plate to its normal position, as shown in Fig. 8.

*Totalizing operations*

When it is desired to take a total from either of the three totalizer lines, the total lever 38 (Fig. 2) is moved downwardly to the appropriate one of three totalizing positions below the adding position. The movement of this lever conditions the machine to cause the selected totalizer line to be rocked into engagement with the actuators near the beginning of the operation. The differential mechanism operates as usual and the latches are disconnected by the long teeth of each individual totalizer wheel, when this tooth reaches the zero position, thereby transferring the amount on the totalizer to the type wheels. The totalizer wheels are then withdrawn from engagement with the actuators which will leave them in the zero position.

When a sub-total is to be taken the total lever is moved upward from its normal adding position. This movement sets mechanism to cause the selected totalizer line to be rocked into engagement while the totalizer wheels are returned to zero and the amount set up on the type wheels. The totalizer, however, is held in engagement with the actuators while the said actuators are returned to their home positions, so that the amount taken from the totalizer wheels is again returned thereto before the disengaging movement of the totalizers relatively to the actuators takes place.

*Mechanism for giving the machine two cycles of operation for totalizing*

More time is required to perform the totalizing operation than is required in an adding operation and, therefore, mechanism is provided under the control of the total lever 38 for giving the machine two cycles of operation on such operations. The means for accomplishing this result are very old and well known in machines of this type, and will therefore be but briefly described herein.

The total lever 38 is formed with a substantially circular plate 241 (Fig. 2) loosely pivoted in a sleeve mounted on a stud 242 supported by the machine side frame. This sleeve is used for connecting mechanism not shown herein but which is shown and described in the above mentioned application. This plate 241 has a cam slot 243 formed therein, with which a pin 244 cooperates. The pin 244 is carried by a lever 245 pivoted on a stud 246 in the machine frame. Also pivoted on the stud 246 is an arm 247. The lever 245 and arm 247 are so formed that together they constitute a cam groove 248, with which a pin 249 carried by an arm 250, fast on a shaft 251, cooperates.

Figure 2:
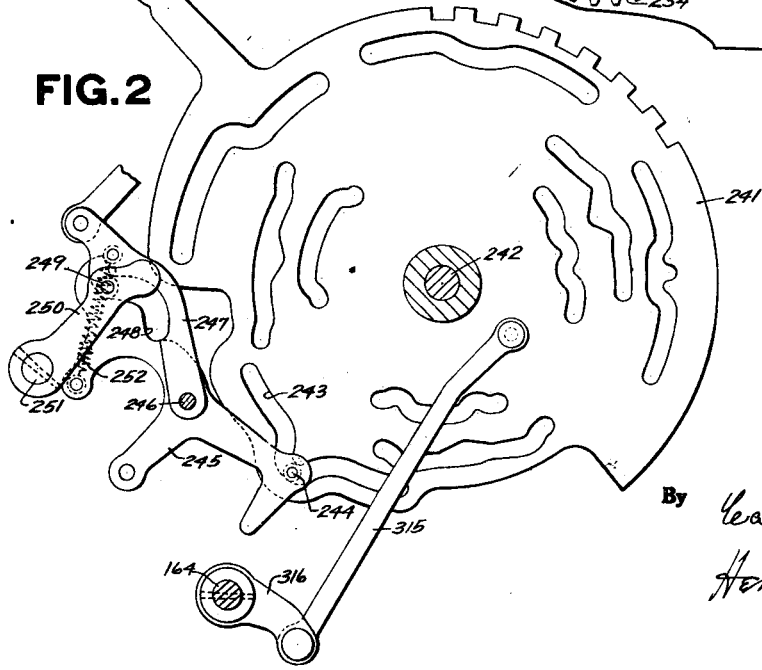
Fig. 2 is a detail view in side elevation of the total lever plate and some of its cooperating mechanism.
Figure 3:
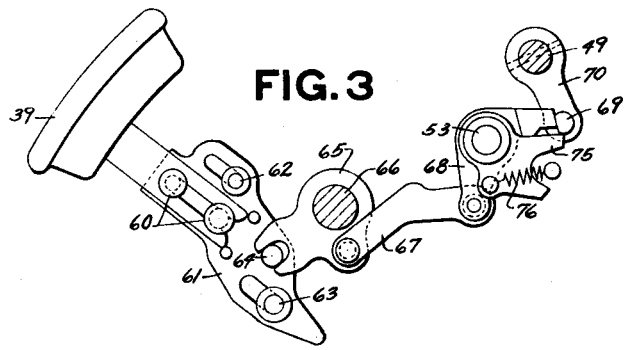
Fig. 3 is a detail view in side elevation of the release mechanism.

It can be seen from Fig. 2 that when the total lever 38 is moved either up or down, out of its adding position, the lever 245 will be rocked counter-clockwise due to the shape of the cam slot 243. This movement of the lever 245 will be transmitted to the arm 247 by means of a spring 252 stretched between a projection of the lever 245 and a pin on arm 247. As the lever 245 and arm 247 rock in a counter-clockwise direction, the arm 250 will be rocked in a clockwise direction due to the shape of the cam groove 248 formed by lever 245 and arm 247, and therefore, the shaft 251 will also be rocked in a clockwise direction.

Fast on the shaft 251 is an arm 253 (Fig. 1) which is connected by a link 255 to one end of a lever 254 pivoted on stud 77. Pivotally connected to the opposite end of the lever 254 is a bar 256 slidably supported intermediate its ends on the stud 28, above mentioned. At its opposite end, the bar 256 has a pin which projects through a guide slot formed in the link 73. The bar 256 carries two pins 330 which embrace an ear 331 formed on the end of a latch member 257 adapted to slide in a groove 258 in the gear 27. A cam 259 is rotatably mounted upon the stud 28, but on adding operations it will not be rotated. When, however, the total lever 38 is moved out of its adding position, and the shaft 251 is rotated clockwise, as above described, the lever 254 will also be rocked in clockwise direction through the arm 253 and link 255 and will pull the bar 256 to the left, as seen in Fig. 1. This movement, through the pins 330 and the ear 331 above mentioned, will slide the latch 257 toward the left so that the end thereof will engage with a recess formed in the gear 27 and thereby connect the gear 259 with the driven gear 27. The bar 256 also carries on its inner face a roller 260 which, when this bar is moved, as above described, will enter a cam groove 261 formed in the gear 259. This mechanism is old and well known in the art and for a more detailed description reference may be had to Letters Patent of the U. S. No. 1,242,170, issued to F. L. Fuller, October 9, 1917.

It will be remembered that the release shaft 49 is returned to its normal position by the pin 79, carried by arm 78, engaging the shoulder 81 of the opening 80 in the link 73 and pulling said link downwardly. On totalizing operations the gear 27 will receive one complete revolution and, as the cam 259 is connected thereto by latch 257 during totalizing operations, this cam will also receive a complete revolution. The conformation of the cam groove 261 is such that upon the rotation of the cam 259 the bar 256, which was moved to the left by manipulation of the total lever 38, will be moved still farther to the left and, as this bar is connected to the link 73, the link 73 will be rocked clockwise about its pivot. Then when the arm 78 is rocked clockwise to lower the link 73, the pin 79 will not strike the shoulder 81 of the link 73, but will move freely in the opening 80 without affecting the said link and, therefore, the release shaft 49 will not be returned to normal until near the end of the second cycle of a total operation at which time the link 73 will have been returned by the bar 256 to the position shown in Fig. 1, so that the pin 79 is in engagement with a shoulder 93 and, when the arm 78 is rocked clockwise, the link 73 will be lowered.

*Mechanism for disconnecting the latches of the differential mechanism under the control of the totalizer wheels*

As above described, the totalizers 140 are rocked into engagement with the actuators 113, 115 at the beginning of a totalizing operation and are then rotated backwardly to zero. It is necessary to provide means for disconnecting the latches 110 of the differential mechanisms from the driving segments 108 when the totalizers reach the zero position. This means will now be described the mechanisms being similar for each totalizer line.

Adjacent each of the totalizer lines 141 is a shaft 53 (Fig. 6) having mutilated gears 266 fast thereon, there being a mutilated gear for each actuator 113, 115. Meshing with the mutilated gears are segments 267 pivoted on studs 268 projecting from the hanger 104. The segments 267 have extensions 269 bifurcated to surround a stud 270 which forms the pivotal point of the two arms 271 and 272 of a toggle lever. The arm 271 at its opposite end is pivotally connected to a bell crank lever 273, while the arm 272 at its opposite end is pivoted to a rocking dog 274 carrying a half round stud 265, adapted to engage one of a series of internally arranged teeth carried by the substantially circular skeleton disk 275 (Fig. 6). Integral with the disk 275 is the projecting neck 276 having a slot formed at its outer end through which projects a pin 277 carried by the forwardly extending arm of the bell crank lever 112, which it will be remembered, supports the forward end of the latch 110 for the differential mechanism. Whenever the total lever 38 is moved to one of its totalizing positions, the shafts 53 and gears 266 thereon are rocked in a counter-clockwise direction, which movement, through the segments 267 will straighten the toggles formed by the arms 271 and 272. The means for rocking gears 266 and shafts 53 on totalizing operations is very old and is described and shown in the patent to F. L. Fuller No. 1,242,170, granted Oct. 9, 1917. The straightening of these toggles will position arms 278 of the bell crank levers 273 in the paths of movement of the long teeth which are formed in the zero positions of the totalizer wheels 140. It will be recalled that the half cent wheels have one of these long teeth in every second place.

When the totalizers 140 are engaged with the actuators 113, 115 and rotated backwardly, the long tooth of each wheel will contact with the associated arm 278 and rock the bell crank lever 273 counter-clockwise, which movement, due to the fact that the toggle formed by links 271 and 272 has been straightened, will rock the dog 274 clockwise and cause the half round stud 265 carried thereby to engage one of the teeth carried by the disk 275. This engagement will immediately stop the movement of the disk which travels with the actuators, and, through cooperation of the neck 276 thereof with the pin 277 carried by bell crank lever 112, will disconnect the latch 110 of the differential mechanism appropriate thereto at a position corresponding to the amount which previously stood upon the totalizer wheel.

If the totalizer wheel stood at zero, then the long tooth of the totalizer wheel will contact with the arm 278 as soon as the engagement takes place and, through the mechanism above described, disconnect the latch of the differential mechanism in the zero position.

It will be remembered that in adding operations, if no keys in a bank are depressed, the latch of the differential mechanism will be disconnected in the zero position by the zero stop pawl 121. As in totalizing operations no keys are depressed, it is necessary to provide means for disabling all of the zero stop pawls 121 on such operations. This is accomplished by the movement of the shaft 251 which has been previously described, as seen in Fig. 4. This shaft is rocked in a counter-clockwise direction. A plurality of arms 264 are fast thereon and carry a rod 279 adapted to cooperate with a finger 280 of an arm 263 fast on the shaft which carries the zero stop pawl. Thus it can be seen that when the shaft 251 is rocked counter-clockwise the rod 279 engages the fingers 280 and rocks all of the zero stop pawls 121 to their ineffective positions. As the rod 279 assumes the position just mentioned, it will come into the path of a foot 281 of the link 45 which supports the key detent bar 43 to prevent any counter-clockwise movement of the link 45 which will prevent the depression of any of the amount keys 34 while the total lever 38 is out of its adding position.

*Mechanism for operating the one half cent special counter and the item sales special counter on totalizing operation*

It will be remembered that the special counter 188 (Fig. 8) is for registering "1" whenever a total is taken of a multiple item transaction that ends in a ½¢. It will also be remembered that the special counter 189 is actuated to add "one" every time a total is taken of a multiple item transaction which does not end in a ½¢. These two counters, therefore, are only actuated when totals are taken. The sliding finger 208 (Fig. 8) carried by the lever 206, which selects the special counter to be operated, is connected to and moves with the differential mechanism for the transaction bank. When a multiple item total is taken and the totalizer selected is engaged with the actuators and the machine operated, the differential mechanism for the transaction bank will be stopped either in the zero position or in the "1" position. It will be stopped in the zero position when the "one half cent" totalizer wheel has one of its long teeth so positioned that it will engage the arm 278 (Fig. 6) immediately upon the movement of the differential mechanism which, as above described, will cause the differential latch 110 to be disconnected in the zero position, that is, when there is no "one half cent" standing thereon.

If on the outher hand, the "one half cent" is standing on the "one half cent" totalizer wheel, the wheel will be rotated just one step until the next high tooth comes into contact with the arm 278 for the purpose of disconnecting the latch. The latch will therefore be disconnected in the "1" position when a "one half cent" is standing on the "one half cent" totalizer wheel.

Considering first, the operation in which there is no "one half cent" on the "one half cent" wheel and the differential mechanism is stopped in the zero position, it can be seen that the finger 208 will be positioned beneath the end of the arm 220. On totalizing operations, however, the arm 215 and cam 214 are rocked in a counterclockwise direction far enough so that a pin 290 carried at the lower end of the sliding finger 208 and projecting through a slot in the selecting lever 206, will extend across both of the cams 213 and 214 and will rest upon the low portions of both of these cams. This will permit the spring 212 to pull the sliding finger 208 downwardly, thus removing the lip 209 from beneath the end of the arm 220. At the same time the arm 215 comes into contact with a pin 291 carried by an L-shaped lever 292 pivoted at one end at 210 to the selecting lever 206. The sides of the arm 215 are beveled so that by its pressure against the pin 291 it will rock the lever 292 counter-clockwise about its pivot to position a bent end 293 thereof just below the slotted tappet 198 for the counter 189. When the arm 215 is moved by the total lever 38, the L-shaped lever 292 will be rocked clockwise by a spring until it contacts with a shoulder 309 projecting from the selecting lever 206 beneath the pin 291.

It can, therefore, be seen that when the actuating bar 203 is lowered, the slotted tappet 198 for the counter 189 will be held against sliding movement on the pin 200 and, therefore, will cause the units wheel on this counter to receive one unit of movement.

If, however, the "one half cent" wheel of the totalizer has a "one half cent" standing thereon, the transaction bank differential and the selecting lever 206 will be moved to the "1" position, which will bring the lip 209 of the sliding finger 208 beneath the slotted tappet 198 for the multiple item counter 190. The same operation will be performed in this instance as was just described above, that is, the cam 214 will be so positioned that the tappet 208 can slide inwardly and the arm 215 will also be positioned so as to force the lever 292 upwardly and hold it just beneath the slotted tappet 198 for the "one half cent" counter 188. Then when the actuating bar 203 is moved, one unit will be added to the counter 188.

It is evident that when either the counter 188 or the counter 189 is selected for operation, and the sliding finger 208 is withdrawn from beneath the end of arm 220 or the slotted tappet 221 for the multiple item counter, this counter will be disabled. This occurs at the same time and is accomplished by the same mechanism as is the selection of counter 188 or 189.

It will be remembered that the machine is given two cycles of operation on totalizing operations. It is, therefore, essential that some mechanism be provided which will permit the actuating bar 203 to be actuated only once, or otherwise the appropriate special counter selected would be operated twice. The means for accomplishing this function and also the means for properly positioning the arm 215 on totalizing operations, are both actuated by the movement of the shaft 251. The latter mechanism will be described first. Fast on the shaft 251 (Fig. 8) is a bell crank lever 295 to an arm 296 of which is pivoted one end of a link 297 pivoted at its upper end to the arm 215. It will be recalled that the shaft 251 is given an initial movement by means of the total lever, the extent of which is about 15°. Nearly at the end of the first cycle of operation, the cam 259 gives the shaft 251 a secondary movement of about 19°. It can, therefore, be seen from Fig. 8 that, as the shaft 251 and bell crank lever 295 rock clockwise a total of 34°, the arm 215 and cam 214 fast thereto are rocked counter-clockwise to the position in which the arm is in effective relation with the pin 291 for the purpose of actuating either of the selected counters 188 or 189.

The mechanism for disabling the counter actuating bar 203 during the first cycle of operation of the machine when a total is being taken, will now be described: A cam slot 298 is formed in the remaining arm of the bell crank lever 295 through which projects a pin 299 carried by an arm 300 of a spider member 301. The spider 301 is loose on the shaft 230 and has a downwardly extending arm 302 which normally contacts with a pin 303 (Figs. 8 and 9) carried by one arm of a lever 304. The arm 302 is held in contact with the pin 303 by a spring 305 extending between another arm 306 of the spider 301 and a pin 321 carried by the lever 304. This lever 304 carries a pin 307 (Fig. 9) which projects through a slot 308 formed in the link 226, which connects the special counter actuating mechanism with the actuating bar 203. It will be recalled that the link 226 has a pin 227 which normally rests in the offset of an angular opening 228 in the actuating arm 229 fast on the shaft 230. This arm is rocked counter-clockwise and then clockwise at every operation of the machine in order to actuate the selected special counters.

When the shaft 251 and bell crank lever 295 are given the initial 15° movement, above mentioned, by the total lever, the spider 301 will be rocked counter-clockwise (Fig. 8) due to the shape of the slot 298 in the bell crank lever 295 and this movement of the spider 301 will, through the pin 303, rock the lever 304 counter-clockwise. This rocking movement of the lever 304, through the slot and pin connection therebetween, rocks the link 226 clockwise about its pivot on the arm 223, and raises the pin 227 out of the offset of the opening 228 in the actuating arm 229. It can, therefore, be seen, that during the first cycle of operation of the machine, the actuating arm 229 will rock counter-clockwise and then clockwise without having any effect upon the link 226 and, therefore, the counter actuating bar 203 will not be moved.

When, however, near the end of the first cycle of operation, the bell crank lever 295 is given its additional 19° of clockwise movement, as above described, the shape of the slot 298 will return the spider 301 to the same position it held at the beginning of the operation and, due to the connection of the spring 305, the lever 304 will be rocked clockwise, thereby lowering the pin 227 into the offset of the opening 228. Then when the machine is given its second cycle of operation, the actuating arm 229 will pull the link 226 downwardly, which will, through arm 223 and arm 205, lower the counter actuating bar 203 to add "one" to the selected special counter.

*Disabling special counters when any total except a multiple item total is taken*

It can readily be appreciated that when a total is taken from either the daily or periodical totalizer, it is not desired to add to the special counters. When, however, the total is one of a plurality of items forming a transaction, it is desired to add to the special counters. The first position below adding position is the position occupied by the total lever on multiple item totaling operations. The second position below adding position selects the front totalizer and the third position the back totalizer. It is also not desirable to make any addition on the special counters when a sub-total is taken from any of the totalizers. Mechanism is, therefore, provided which will disable the counter actuating mechanism when any sub-total or any total except a multiple item total is taken.

Pivoted to the total lever plate 241 (Fig. 2) is a link 315, which at its opposite end is pivoted to an arm 316 fast to the previously mentioned shaft 164. Also fast to the shaft 164 is a cam plate 317 (Figs. 8 and 9), the upper edge of which is adapted to cooperate with a roller 318 carried by one arm of a bell crank lever 319 loose on the shaft 230. A downwardly extending arm of the lever 319 has a foot 320 which normally contacts with the pin 321 on the lever 304.

It can be seen from the above that, as the total lever 241 is moved, the cam plate 317 will also be moved to a corresponding extent. The cam plate 317 has a recess 322 in which the roller 318 normally rests when the total lever is in the adding position. When the total lever is moved down to its first position below adding, the roller 318 will not be moved, because of the length of the recess 322 in the face of the cam plate. If, however, the total lever is moved to its second or third position below normal, the roller 318 will be raised by the cam plate 317 and the lever 319 will consequently be rocked in a counter-clockwise direction. This movement of the lever 319 will, through the foot 320 and pin 321, rock the lever 304 counter-clockwise which, as above described, will raise the pin 227 out of the offset of the angular opening 228 in the counter actuating arm 229. Then when this arm is rocked to actuate the counter actuating bar 203, the link 226 will not be moved, as the pin will ride in the large upper part of the opening 228 and, therefore, the counters will not be actuated. If a sub-total is to be taken and the total lever is moved upwardly, the lever 319 will be rocked immediately by the cam plate 317, and therefore, the counters will be disabled in the manner just above described.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In an accounting device, the combination of a totalizer involving a plurality of totalizer elements, differentially movable actuators correlated with their respective totalizer elements, and means for shifting said totalizer elements with relation to the actuators to prevent actuation of certain of said elements while permitting actuation of the remainder of said elements by their respective actuators.

2. In an accounting device, the combination of a totalizer involving a plurality of totalizer elements, differentially movable actuators correlated with their respective totalizer elements, and means for shifting said totalizer elements laterally with relation to the actuators to prevent actuation of certain of said elements while permitting actuation of the remainder of said elements by their respective actuators.

3. In an accounting device, the combination of a plurality of differentially movable actuators, a plurality of totalizer wheels adapted to be actuated thereby, certain of said wheels being wider than others of said wheels, and means for shifting all of said wheels to prevent actuation of the narrow wheels while permitting actuation of the wide wheels.

4. In an accounting machine, the combination of a shiftable totalizer comprising a wide wheel and a relatively narrow wheel, and actuators adapted to drive said wheels in one position of the totalizer and only the wide wheel in another position of the totalizer.

5. In an accounting device, the combination of a shiftable totalizer comprising a plurality of wide wheels and a single relatively narrow wheel, actuators adapted to cooperate with said wheels, and shifting means for said totalizer adapted to position said wheels so that all will engage the actuators, so that only certain wheels will engage with the actuators, or so that none will engage said actuators.

6. In an accounting device, the combination of a shiftable totalizer comprising a plurality of wide wheels and a single relatively narrow wheel, an actuator for each of said wheels, a plurality of depressible keys, and means under control of said keys for shifting said totalizer laterally with respect to said actuators.

7. In an accounting device, the combination of a movable totalizer comprising a plurality of wide wheels and a relatively narrow wheel, an actuator for each of said wheels, a plurality of depressible keys, differential mechanism under control of said keys, and connections between said differential mechanism and said totalizer for moving said totalizer to a plurality of positions.

8. In an accounting device, the combination of a movable totalizer comprising a plurality of wide wheels and a relatively narrow wheel, an actuator for each of said wheels, a plurality of depressible keys, differential mechanism under control of said keys, a link actuated by said differential mechanism, and connections between said link and the totalizer for moving said totalizer to different positions of adjustment.

9. In an accounting device, the combination of a movable totalizer comprising a plurality of wide wheels and a relatively narrow wheel, an actuator for each of said wheels, a plurality of depressible keys, differential mechanism under control of said keys, a link actuated by said differential mechanism, an arm pivoted to said link, and connections between said arm and said totalizer for moving the totalizer to one of several positions of adjustment.

10. In an accounting device, the combination of a plurality of movable totalizers, each comprising a single narrow wheel and a plurality of wide wheels, actuators for each of said wheels, a plurality of manipulative devices, differential mechanism under control of said devices, a link actuated by said differential mechanism, and connections between said link and said totalizer for sliding all of said totalizers simultaneously to different positions.

11. In an accounting device, the combination of a plurality of movable totalizers, each comprising a single narrow wheel, and a plurality of wide wheels, actuators for each of said wheels, a plurality of depressible keys, differential mechanism under control of said keys, a link actuated by said differential mechanism, an arm pivoted to said link, a segment gear fixed to said arm, and connections between said gear and said totalizers for sliding all of said totalizers simultaneously to different positions.

12. In an accounting device, the combination of a plurality of movable totalizers, each comprising a single narrow wheel and a plurality of wide wheels, actuators for each of said wheels, a plurality of depressible keys, differential mechanism under control of said keys, a link actuated by said differential mechanism, an arm pivoted to said link, a segment gear secured to said arm, a rack meshing with said segment gear, and connections between said rack and said totalizers for moving all of said totalizers laterally simultaneously to different positions of adjustment.

13. In an accounting device, the combination of a plurality of movable totalizers, each comprising a single narrow wheel and a plurality of wide wheels, actuators for each of said wheels, a plurality of depressible keys, differential mechanism under control of said keys, a link actuated by said differential mechanism, an arm pivoted to said link segment gear secured to said arm, a rack meshing with said segment gear, a sliding member carrying said rack, and connections between said sliding member and said totalizers adapted to move all of said totalizers simultaneously to a position predetermined by the depressed key.

14. In an accounting device, the combination of a plurality of movable totalizers, each comprising a single narrow wheel and a plurality of wide wheels, actuators for each of said wheels, a plurality of depressible keys, differential mechanism under control of said keys, a link actuated by said differential mechanism, an arm pivoted to said link, a segment gear secured to said arm, a rack meshing with said segment gear, a sliding member carrying said rack and having a plurality of cam slots formed therein, and connections actuated by the cam slots in said sliding member to move all of said totalizers simultaneously to different positions of adjustment.

15. In an accounting device, the combination of a plurality of movable totalizers, each comprising a single narrow wheel and a plurality of wide wheels, actuators for each of said wheels, a plurality of depressible keys, differential mechanism under control of said keys, a link actuated by said differential mechanism, an arm pivoted to said link, a segment gear secured to said arm, a rack meshing with said segment gear, a sliding member carrying said rack and having a plurality of cam slots formed therein, and a plurality of bifurcated members, one for each of said totalizers, and each carrying a roller adapted to cooperate with the corresponding cam slot in said slidable member for the purpose of moving its totalizer to the position selected by the depressed key.

16. In an accounting machine, the combination of a totalizer involving broad and relatively narrow elements, actuators for said totalizer elements, and means for establishing an operative relation between said totalizer elements and said actuators so that only a portion of said elements will be actuated.

17. In an accounting device, the combination of a group of totalizer elements, a group of actuating elements, said groups being relatively bodily shiftable, one of said groups having relatively broad and narrow elements, and means for bodily shifting one of said groups to render certain of said actuating elements ineffective.

18. In an accounting device, the combination of a group of totalizer elements, a group of actuating elements, said groups being relatively shiftable, one of said groups having relatively broad and narrow elements, and means for shifting one of said groups to render certain of said actuating elements ineffective.

19. In an accounting device, the combination of a totalizer comprising a group of totalizer elements, a group of actuating elements therefor, certain of the elements of one of said groups being adapted to be slid to ineffective position, and means for sliding said elements.

20. In an accounting device, the combination of a totalizer comprising a group of totalizer elements, a group of actuating elements therefor, said groups being normally disengaged, certain of the elements of one of said groups being adapted to be rendered ineffective, and means for engaging said totalizer and actuating elements 21. In an accounting device, the combination of a totalizer comprising a group of totalizer elements, a group of actuating elements therefor, said groups being normally disengaged, certain of the elements of one of said groups being adapted to be rendered ineffective on certain operations, and means for engaging said totalizer and actuating elements.

22. The combination of a counter, a totalizer, and means operable under the control of the totalizer element of lowest denomination for actuating said counter.

23. The combination of a counter, a totalizer, means for actuating said counter, and differentially movable means under control of said totalizer for rendering said actuating means effective.

24. The combination of a counter, a totalizer, means for actuating said counter, and differentially movable means under control of the totalizer element of lowest denomination for rendering said actuating means effective.

25. The combination of a counter, a totalizer, and means controlled by said totalizer on total-taking operations for actuating said counter.

26. The combination of a counter, a totalizer, and means controlled by the totalizer element of lowest denomination on total-taking operations for actuating said counter.

27. The combination of a plurality of counters, a totalizer, and means operable under control of the totalizer element of lowest denomination for selecting any of said counters for operation.

28. The combination of a plurality of counters, a manipulative device, a totalizer, and means under control of said manipulative device on certain operations and said totalizer on certain other operations for selecting one of said counters for operation.

29. The combination of a plurality of counters, a manipulative device, a totalizer, and means under control of said manipulative device on adding operations and said totalizer on total-taking operations for selecting the counter to be operated.

30. The combination of a plurality of counters, a key, a totalizer, and means under control of said key on adding operations and one of said totalizer elements on total-taking operations for selecting the counter to be operated.

31. The combination of a plurality of counters, a totalizer, and means operable under control of said totalizer for selecting any of said counters for actuation.

32. The combination of a plurality of counters, a totalizer comprising a plurality of totalizer elements, and means operable under control of one of said elements for selecting any of said counters for actuation.

33. The combination of a plurality of counters, a totalizer element, and means operable under control of said element for selectively operating said counters.

34. In a machine capable of accumulating and total taking operations, the combination of a plurality of counters, a totalizer, a plurality of keys, and means controlled by said keys during accumulating operations and by said totalizer during total taking operations for selectively operating said counters.

35. In a machine capable of accumulating and total-taking operations, a plurality of counters, a totalizer, a key, means under control of said key during accumulating operations and under said totalizer during total-taking operations for selectively causing operations of said counters.

36. In a machine of the class described, the combination of a plurality of counters, individual actuating means for said counters, a common operating means for said actuating means, a plurality of keys, means controlled by said keys for rendering said operating means effective to drive said actuating means, and means cooperating with said actuating means and said key controlled means for rendering said operating means effective as to said actuating means in another position of said controlled means.

37. In a machine of the class described, the combination of a plurality of counters, differentially movable selecting means therefor, and means cooperating with said selecting means for causing an operation of the same counter in a plurality of positions of said selecting means.

38. In a machine of the class described, the combination of a plurality of counters, differentially movable selecting means therefor, counter actuators, operating means therefor adapted to be rendered effective and ineffective with respect to said actuators as determined by said selecting means, and means cooperating with said selecting means in either of two of its positions to render said operative means effective to drive the same counter actuator.

39. The combination of a plurality of counters, individual actuating means therefor, an operating means therefor, means for slidably connecting said actuating means to said operating means for normally preventing operation of said actuating means; a differentially movable member for rendering said connecting means effective to operate said actuating means, and means for rendering the same connecting means effective in two positions of said differentially movable member.

40. In a machine of the class described, the combination of a main operating mechanism, a plurality of counters, counter operating mechanism adapted to be connected and disconnected from said main operating mechanism, a total control means for controlling the machine for accumulating, for taking the total of items of a multiple item transaction, and for taking totals of single item transactions, a cam operated by said control means and provided with a low portion corresponding to the accumulating and the total of items of a multiple item transaction positions of said control means, and high portions corresponding to the totals of single item transactions position of said control means, and means operated by said cam for controlling the connection between said main and counter operating means.

41. In a machine of the class described, the combination of a main operating mechanism, a plurality of counters, counter operating mechanism adapted to be connected and disconnected from said main operating mechanism, a total control lever for controlling the machine for accumulating, for taking the total of items of a multiple item transaction, and for taking totals of single item transactions, a cam operated by said control means and provided with a low portion corresponding to the accumulating and the total of items of a multiple item transaction positions of said control means, and high portions corresponding to the totals of single item transactions position of said control lever, and means controlled by said cam for controlling the connection between said main and counter operating means.

42. The combination of a plurality of counters, individual actuating means therefor, a common operating means for said actuating means normally ineffective to operate said actuating means, a differentially movable member, keys for controlling the movement of said member, a spring-actuated retractable member carried by said differentially movable member operative to selectively render said operating means effective, and a stationary member bearing against said retractable member in certain positions of said differentially movable member to hold said retractable member in functioning position.

43. The combination of a plurality of counters, individual actuating means therefor, a common operating means for said actuating means normally ineffective to operate said actuating means, a differentially movable member, keys for controlling the movement of said member, a string-actuated retractable member carried by said differentially movable member operative to selectively render said operating means effective, and a stationary cam member bearing against said retractable member in certain positions of said differentially movable member to hold said retractable member in functioning position.

44. The combination of a plurality of counters, individual actuating means therefor, a common operating means for said actuating means normally ineffective to operate said actuating means, a differentially movable member, keys for controlling the movement of said member, a spring-actuated retractable member carried by said differentially movable member operative to selectively render said operating means effective, a stationary member bearing against said retractable member in certain positions of said differentially movable member to hold said retractable member in functioning position, and a movable supporting member adapted to bear against said retractable member in other positions of said differentially movable member to hold said retractable member in functioning position.

45. The combination of a plurality of counters, individual actuating means therefor, a common operating means for said actuating means normally ineffective to operate said actuating means, a differentially movable member, keys for controlling the movement of said member, a spring-actuated retractable member carried by said differentially movable member operative to selectively render said operating means effective, a stationary member bearing against said retractable member in certain positions of said differentially movable member to hold said retractable member in functioning position, a movable supporting member adapted to bear against said retractable member in other positions of said differentially movable member to hold said retractable member in functioning position, and a total control means for controlling the movement of said movable supporting member.

46. The combination of a plurality of counters, individual actuating means therefor, a common operating means for said actuating means normally ineffective to operate said actuating means, a differentially movable member, keys for controlling the movement of said member, a spring-actuated retractable member carried by said differentially movable member operative to selectively render said operating means effective, a stationary member bearing against said retractable member in certain positions of said differentially movable member to hold said retractable member in functioning position, a movable supporting member adapted to bear against said retractable member in other positions of said differentially movable member to hold said retractable member in functioning position, a total control means for controlling the machine for a two-cycle operation, a means operated by said control means for preventing an operation of said operating means, and means operated toward the end of the first cycle of operation for moving said movable supporting member to cause said retractable member to be moved out of functioning position.

47. The combination of a plurality of counters, individual actuating means therefor, a common operating means for said actuating means normally ineffective to operate said actuating means, a differentially movable member, keys for controlling the movement of said member, a spring-actuated retractable member carried by said differentially movable member operative to selectively render said operating means effective, another spring-actuated retractable member carried by said differentially movable member for rendering said operating means effective with respect to said counter actuating means, a stationary member for supporting the first mentioned retractable member in functioning position in certain positions of said differentially movable member, a movable member for supporting said first mentioned retractable member in functioning position in other positions of said differentially movable member, and a member movable with said movable supporting member to project said second mentioned retractable member into functioning position as said first mentioned retractable member is permitted to recede by movement of said movable supporting member.

48. In a machine of the class described, the combination of a totalizer element, an actuator therefor, and a manipulative device adapted to control the differential movement of the actuator, to position the said totalizer element for actuation and to limit the rotational movement thereof by said actuator.

49. In a machine of the class described, the combination of a totalizer wheel having a long tooth, an actuating segment therefor, and a depressible key adapted to control the differential movement of the segment, to position the totalizer wheel for actuation and to limit the rotational movement of said wheel by said segment.

In testimony whereof I affix my signature.

BERNIS M. SHIPLEY.